(12) United States Patent
Gerstenmayer

(10) Patent No.: US 6,727,503 B1
(45) Date of Patent: Apr. 27, 2004

(54) TWO DIMENSIONAL IONIZING RADIATION DETECTOR AND METHOD FOR THE PRODUCTION THEREOF

(75) Inventor: Jean-Louis Gerstenmayer, Orsay (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/926,328
(22) PCT Filed: Apr. 11, 2000
(86) PCT No.: PCT/FR00/00917
  § 371 (c)(1),
  (2), (4) Date: Oct. 15, 2001
(87) PCT Pub. No.: WO00/63723
  PCT Pub. Date: Oct. 26, 2000

(30) Foreign Application Priority Data

Apr. 15, 1999 (FR) .............................. 99 04725

(51) Int. Cl.$^7$ ................................ G01T 1/24
(52) U.S. Cl. .................. 250/370.09; 250/367
(58) Field of Search ............ 250/370.09, 367, 250/336.1

(56) References Cited

U.S. PATENT DOCUMENTS

| 4,210,805 A | | 7/1980 | Kobayashi et al. | |
| 4,937,453 A | * | 6/1990 | Nelson | 250/370.09 |
| 5,117,114 A | | 5/1992 | Street et al. | |
| 5,434,417 A | * | 7/1995 | Nygren | 250/370.01 |
| 5,889,313 A | * | 3/1999 | Parker | 257/429 |

OTHER PUBLICATIONS

A. P. Jeavons, et al., Nuclear Instruments and Methods, vol. 124. No. 2. pps. 491–503, "The High–Density Multiwire Drift Chamber", Mar. 1, 1975.
S. N. Kaplan, et al., Nuclear Instruments and Method, vol. 106, pps. 397–406, "Multiwire Proportional Chambers for Biomedicial Application", 1973.
J–L. Gerstenmayer, et al., SPIE. vol. 2859, pps. 107–114, "Multi Step Parallel Plate Avalanche Chamber As a 2D Imager for MeV Pulsed Radiography", 1996.
J–L. Gerstenmayer, Nuclear Instruments and Methods in Physics Research, pps. 1–6, "High DQE Performance X– and Gamma–Ray Fast Imagers: Emergent Concepts", May 11, 1998.

* cited by examiner

Primary Examiner—David Porta
Assistant Examiner—Christine Sung
(74) Attorney, Agent, or Firm—Oblon, Spivak, McClelland, Maier & Neustadt, P.C.

(57) ABSTRACT

A two-dimensional detector of ionizing radiation and a process for manufacturing the detector. The detector includes sheets emitting particles by interaction with ionizing radiation, semiconducting layers that alternate with the sheets and can be ionized by the particles, and groups of conducting tracks in contact with the layers. A created electric field is used to collect charge carriers generated in the layers due to interaction with particles, through the tracks. For example, the layer and the corresponding tracks are formed on each sheet and the sheets are then assembled together. The detector, as an example, is applicable to radiography and can achieve good X-ray detection efficiency and high spatial resolution at the same time.

11 Claims, 3 Drawing Sheets

TWO DIMENSIONAL IONIZING RADIATION DETECTOR AND METHOD FOR THE PRODUCTION THEREOF

TECHNICAL DOMAIN

This invention relates to a two-dimensional detector of ionizing radiation and a process for manufacturing this detector.

For example, the invention can be used to detect X photons, gamma photons, protons, neutrons and muons.

The invention is particularly applicable to the following domains:
- experiments in detonics,
- fast non-destructive testing,
- position of patients in radiotherapy,
- high-energy physics,
- neutronography, protonography, radiography, gammagraphy,
- surgery under radioscopy, and
- safety in airports

STATE OF PRIOR ART

Two-dimensional detectors of ionizing radiation made of plates of a heavy meal such as lead or more generally a material capable of interaction with an incident ionizing radiation, are already known.

In particular, US S 117 114 A describes a radiation detector. In one example, the detector comprises a sequence of plane and parallel detection matrices. Each matrix comprises a set of amorphous silicon detection cells equipped with addressing electrodes and an adjacent layer made of a metallic conversion material such as Pb or U. This makes it possible to determine the energy and initial position of an X photon or a gamma photon that arrives at the first layer of metallic conversion material, perpendicular to this layer.

U.S. Pat. No. 4,210,805 A describes a radiation detector. In one example, eight semiconductor elements 30 are laid out in the form of a matrix. Two opposite faces on each element are covered with conducting layers and the other two faces are covered with insulating layers that separate them from neigbouring elements.

For example, it is known how to use a metal with atomic number Z equal to or greater than 73 to detect X or gamma photons and a material with an atomic number Z usually less than 14 or greater than 90 to detect neutrons. Other materials such as gadolinium (Z=64) can also be used to detect neutrons.

The plates are perforated with holes by chemical or electrochemical etching and are electrically insulated from each other if necessary (when the required thickness of the plates is equal to 100 or more micrometers).

The holes are filled with an ionizable gas.

An incident high energy X or gamma photon then generates at least one photoelectron in one of the plates of the detector, by the Compton effect or by the pair creation effect.

This incident X or gamma photon communicates fast movements to this electron with a kinetic energy of the order of magnitude of the energy of the incident photon. This fast electron then ionizes some gas molecules contained in one of the holes into which the electron arrives, and through which the electron usually passes.

The slow secondary electrons that are torn off these molecules due to ionization of these molecules, are guided along this hole and collected using an electrical bias field, also called an electrical drift field, and are then detected, for example, in an ionization chamber or in a proportional avalanche chamber.

This type of two-dimensional detector is described in a number of documents including references [1], [2], [3], [4] and [5] mentioned at the end of this description.

A detection structure with holes is chosen because this type of structure is known to be very conducive to obtaining a good spatial resolution and a good efficiency, provided that the holes are perfectly formed and are sufficiently large.

These holes are formed by chemical etching. This method is preferred to water jet cutting which generates a front shock when the jet is opened, when starting to perforate a hole.

This front shock causes scaling of the material in which the holes are to be formed, which causes spalling of this material and makes it unsuitable for use.

But chemical etching is a slow and expensive technique.

Furthermore, the efficiency at which secondary electrons are collected and therefore the efficiency these hole detectors are limited because this technique is used. For example, only 10 to 30% of the secondary electrons created during each gas ionization are typically collected.

Chemical etching cannot be used to produce holes with sufficiently cylindrical walls because it generates narrow points in the holes that deform the electric field lines and reduce the useful diameter of the holes, with the result that the global efficiency of hole detectors is limited.

PRESENTATION OF THE INVENTION

The purpose of this invention is to overcome these disadvantages of high cost and limited efficiency.

More precisely, the purpose of this invention is a two-dimensional detector of incident ionizing radiation composed of first particles. This detector comprises a stack of sheets of a first material capable of emitting second particles by interaction with the incident ionizing radiation. This detector is characterized in that it also comprises:

layers of a semiconducting material that alternate with sheets of the first material and may be ionized by the second particles, each of the layers being associated with one of the sheets, the stack having first and second opposite faces each containing corresponding edges of sheets and layers, the detector being designed to be laid out such that the ionizing radiation arrives on the first face, the length of each sheet measured from the first face as far as the second face being equal to at least one tenth of the free average path to the first particles in the first material, groups of parallel and electrically conducting tracks extending from the first to the second face parallel to the layers, each group being associated with one of the layers and in contact with it, the tracks being designed to collect charge carriers that are generated in the layers by interaction of the layers with the second particles and possibly with the first particles and that are representative of the first particles in intensity and in position, and means of creating an electric field capable of causing collection of charge carriers through the tracks.

The detector according to the invention can be made at a much lower cost than the hole detectors mentioned above.

Furthermore, the collection efficiency and the spatial resolution of the detector according to the invention may be very much greater than the corresponding values for hole detectors.

According to a particular embodiment of the detector according to the invention, the first material is electrically conducting, the tracks are electrically insulated from the sheets and the means of creating the electric field comprise means of applying a voltage between the tracks and the sheets, this voltage being sufficient to cause the collection of charge carriers through the tracks.

Preferably, each group of tracks is fully located within the layer with which it is associated.

In this case, according to another particular embodiment, the first material is electrically conducting and the means of creating the electric field comprise means of applying a voltage between the tracks and the sheets, this voltage being sufficient to cause collection of charge carriers through the tracks.

According to another particular embodiment, the sheets are electrically insulating, an electrically conducting layer is inserted between each layer of semiconducting material and the sheet that is associated with it and the means of creating the electric field comprise means of applying a voltage between the tracks and the electrically conducting layers, this voltage being able to cause collection of charge carriers through the tracks.

The semiconducting material may be crystalline, ceramic, vitreous, amorphous or polymer.

It may be chosen among the group including thin layers of diamond, CdTe, ZnTe, CdZnTe, AsGa and particularly $AsGaAl_xPl_{-x}$ (0<x<1), InP, InSb, SiC, crystalline silicon, amorphous silicon, organic crystals for example such as anthracene, naphthalene and PPV, amorphous selenium and chalcogenic glass ($As_2S_3$).

The detector according to the invention may also comprise an electronic device for reading electrical signals output by tracks when the tracks collect charge carriers.

According to one preferred embodiment of the invention, one end of each track is curved to extend onto an edge of the corresponding layer of semiconducting material, this edge being located on the second face of the stack, and the device comprises electrically conducting pads that are in contact with the curved ends of the tracks respectively.

This invention also relates to a process for manufacturing the detector according to the invention.

According to this process, a layer of semiconducting material is formed on each sheet, where this layer is provided with the group of tracks associated with it, and the sheets are provided with layers of semiconducting material. The tracks are assembled together to obtain a stack in which these layers of semiconducting material alternate with the sheets.

According to one particular embodiment of the process according to the invention, a first layer of semiconducting material is formed on each sheet, where the thickness is less than the thickness of the layer of semiconducting material. The group of tracks is formed on this first layer and a second layer of semiconducting material that covers these tracks is formed on the first layer. The total thickness of the first and second layers is equal to the thickness of the layer of semiconducting material.

It would also be possible to deposit a half layer of semiconducting material on the two opposite faces of two successive sheets, and then form the group of tracks on one of the half layers and assemble the sheets thus covered to create a stack in which the layers alternate with the sheets.

BRIEF DESCRIPTION OF THE DRAWINGS

This invention will be better understood after reading the description of example embodiments given below, for guidance only and in no way restrictive, with reference to the attached drawings on which.

DETAILED PRESENTATION OF PARTICULAR EMBODIMENTS

Figure 1:
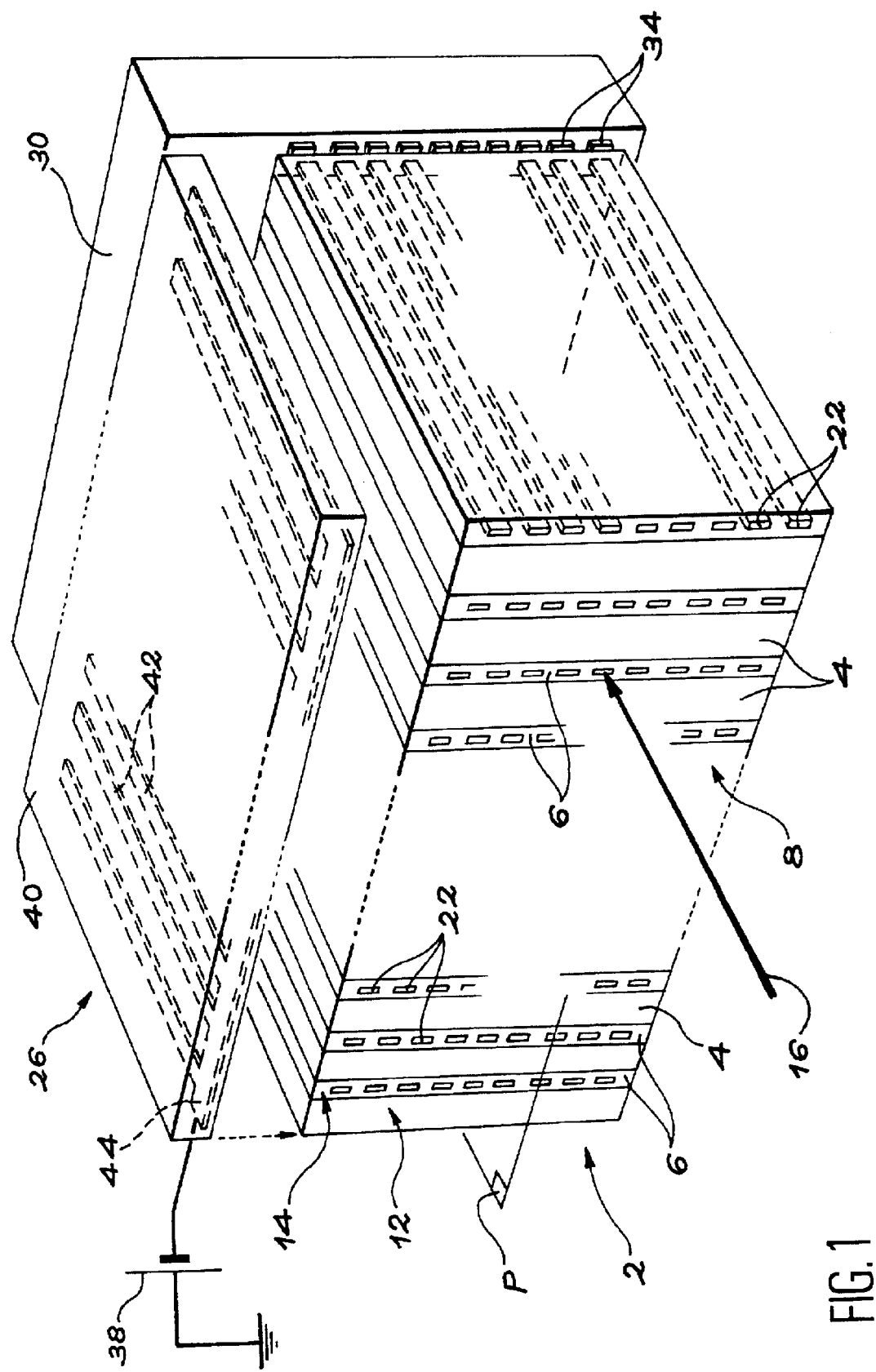
FIG. 1 is a perspective diagrammatic view of a particular embodiment of the detector according to the invention.
Figure 2:
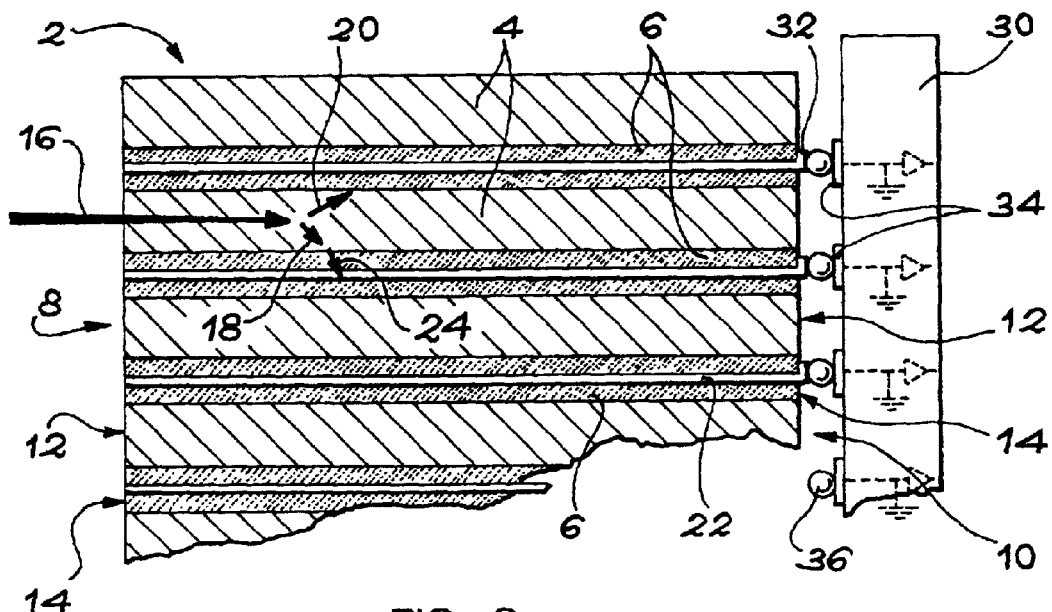
FIG. 2 is a diagrammatic cross-sectional view of the detector in FIG. 1 along plane P on FIG. 1.

A detector of ionizing radiation according to the invention is diagrammatically shown in perspective on FIG. 1 and in a cross-section along a plane P on FIG. 2.

In the example shown, the ionizing radiation is composed of X photons, that may for example have an energy of 5 MeV.

The detector in FIGS. 1 and 2 comprises a stack 2 of sheets 4 of an electrically conducting material that can emit electrons by interaction with X photons in incident ionizing radiation.

This detector also comprises layers 6 of a semiconducting material that alternate with sheets 4 and can be ionized by the photo-electrons emitted by the conducting material when this material interacts with X photons and possibly directly by primary X photons, although to a lesser extent.

Each of the layers 6 is associated with one of the sheets 4.

The stack of sheets 4 and layers 6 has a first face 8 and a second face 10 that are opposite to each other.

Each face 8 and 10 contains edges 12 of sheets 4 and edges 14 of layers 6 that alternate with the edges 12 of sheets 4.

The detector in FIGS. 1 and 2 is oriented such that the ionizing radiation to be detected arrives on face 8.

The length of each sheet 4, starting from face 8 and as far as face 10, is equal to at least one tenth of the average free path of X photons in the conducting material from which the sheets 4 are made.

As can be seen on FIGS. 1 and 2, an incident X photon, with the trajectory as shown as reference 16 on FIGS. 1 and 2, interacts with the conducting material in sheet 4 to produce a high kinetic energy electron with the trajectory shown by arrow 18 on FIG. 2, due to the Compton, photoelectric or pair creation effect.

FIG. 2 also contains an arrow 20 that shows the trajectory of a photon with less energy than the energy of the incident X photon resulting from interaction of this photon with the conducting material of sheet 4.

The detector in FIGS. 1 and 2 also comprises groups of parallel electrically conducting tracks 22 that extend from face 8 as far as face 10 parallel to layers 6.

Each group of tracks 22 is associated with one of the layers 6 and is in contact with it.

Tracks 22 are intended to collect charge carriers that are generated in layers 6 by interaction between these layers and the electrons resulting from the interaction of X photons incident with the conducting material from which the sheets 4 are made.

These charge carriers are representative of the intensity and position of incident X photons.

FIG. 2 shows a charge carrier with a trajectory shown as reference 24 and that results from interaction of the electron with trajectory 18 with a layer 6, and this charge carrier with trajectory 24 is collected by a conducting track 22 associated with this layer 6.

The detector also includes means 26 (FIG. 1) of creating an electric field capable of causing collection of charge carriers through the tracks 22.

For guidance only and in no way restrictively, the detector in FIGS. 1 and 2 is laid out such that sheets 4 and layers 6 are horizontal or vertical, but other orientations are possible depending on the use to be made of the detector.

All that is necessary is that the sheets 4 and layers 6 should be approximately parallel to the direction of the ionizing radiation to be detected.

In the example shown in FIGS. 1 and 2, each group of conducting tracks 22 is contained in the layer 6 with which this group is associated.

This avoids the need to use electrically insulating supports (for example made of plastic or ceramic) for the tracks, these supports being cumbersome which reduces the spatial resolution of the detector, and which in any case are useless for the detection itself.

In the case shown on these FIGS. 1 and 2, the means 26 of creating the electric field are means of applying a voltage between tracks 22 and sheets 4, this voltage being able to cause collection of charge carriers through the tracks 22.

Note that the cut plane P (FIG. 2) passes through the conducting tracks in the same row of tracks (horizontal row on FIG. 1), the tracks on this row belonging to layers 6 respectively.

In a particular embodiment not shown, the material from which the sheets 4 are made is also electrically conducting but the tracks 22 are no longer contained in layers 6 of semiconducting material; each group of tracks is at the interface with the corresponding layer of semiconducting material and the sheet of conducting material that is associated with an adjacent layer of semiconducting material.

In this case, an electrically insulating material is provided to electrically insulate the tracks 22 from the sheets 4 of conducting material, but it would also be possible to use the same means of creating the electric field as above.

The detector in FIGS. 1 and 2 is provided with an electronic device 30 for reading electric signals supplied by tracks 22 when they collect charge carriers.

FIG. 2 clearly shows that one end 32 of each track 22 is curved so that it passes along an edge 14 of the corresponding layer 6, this edge being located on the face 10 of the stack of sheets 4 and layers 6.

The electronic reading device 30 comprises electrically conducting pads 34 that are shown in contact with the curved ends 32 of tracks 22.

This contact may be made using brazing balls 36, for example indium balls, or by means of electrically conducting wires or even using appropriate means to bring the curved ends of the tracks into contact with the pads of the associated reading device, for example by pressing or with an electrically conducting glue.

Note that the pads 34 are laid out at the same pitch as the curved ends 32 of the tracks 22.

An undoped semiconducting material can be used, or alternatively a doped semiconducting material may be used, for example an N type material in which case the electrons are the majority charge carriers, or a P type material in which case holes will be the majority carriers.

A negative voltage can be applied to the conducting sheets 4 and the conducting pads 34 (and therefore tracks 22) can be grounded, or sheets 4 can be grounded and a positive potential can be applied to conducting pads 34 and therefore tracks 22 in order to collect charge carriers.

In both cases, the holes generated in the layers 6 of semiconducting material are attracted by the sheets 4 of conducting material, whereas the electrons generated in these layers 6 are attracted and collected by the tracks 22, thus supplying electrical signals that are read using device 30.

Conversely, a positive potential can be applied to sheets 4 and pads 34 can be grounded or sheets 4 can be grounded and a negative potential car be applied to pads 34. In both cases, electrons are attracted by the sheets and holes are attracted and collected by the tracks, thus providing even more electrical signals that are read using device 30.

In each case, the tracks 22 convert the analog image transported by the X rays that are detected into digital and electrical form.

In the example shown on FIG. 2, all tracks 22 are grounded through electrically conducting pads 34 and a negative potential is applied to all sheets of conducting material 4 by means of a voltage source 38.

In this case, the tracks 22 collect electrons.

A negative potential (for example equal to −500 V) can be applied to all sheets 4 of conducting material using an electrically insulating plate 40 on one face of which electrically conducting parallel tracks 42 are formed at a pitch equal to the pitch of the sheets 4.

All these tracks 42 are connected to a track 44 also formed on this face of the plate 40 and this track 44 is connected to the negative voltage source 38.

The face of the plate 40 on which the tracks 42 are located is then applied in contact with a face of the stack 2 on which the edges of the sheets 4 also appear, this face being different from faces 8 and 10, such that the tracks 42 come into contact with the edges of the corresponding sheets 4, which means that all these sheets 4 can be brought to the required negative potential.

For example, plate 40 is a ceramic or polymer plate and tracks 42 and 44 may be made of gold.

Preferably, for reasons of size and reading speed, the electronic reading device 30 is of the type used in the CCD sensors.

For a detector with modest dimensions, the tracks 22 of the stack 2 can be directly connected to the pixels of a CCD sensor without a coating.

For a detector with larger dimensions, an intermediate connection matrix may be used between tracks 22 of the stack 2 and the reading device, for example of the CCD type.

The conducting pads 34 are then located on one of the faces of this matrix so that they can be connected to the curved ends 32 of the tracks 22, and these pads are electrically connected to the pixels of a reading device, for example of the CCD type, through electrical connections that pass through this matrix.

The thickness of a detector according to the invention, for example like the detector in FIG. 1, measured from face 8 as far as face 10, may be of the same order of magnitude as the thickness of a holes detector of the type described above, this thickness being adapted as a function of the required stopping power.

Note that the material from which sheets 4 are made may be chemically inert or it may be a bad conductor of electricity (a case in which it is insulating will be considered later), unlike the electrochemically machinable material that must be used for hole detectors.

The thicknesses of sheets 4 of conducting material (for insulating material as will be seen later) and layers 6 of semiconducting material are fixed to optimize the spatial resolution of the detector and the conversion efficiency (conversion and collection of charges). Preferably, the smallest possible thicknesses will be used, typically of the order of 100 µm to a few hundreds of micrometers.

For example, it would be possible to use sheets 4 of conducting material with a thickness of the order of 200 µm and layers 6 of a semiconducting material with a thickness of the order of 200 µm.

Note that In hole detectors according to prior art, the thickness of metal sheets measured perpendicular to the direction of the incident radiation, is fixed such that these sheets may be chemically etched (thickness of the order of 200 µm).

In this invention, this constraint is inapplicable, and the thickness of the sheets 4 of material (conducting or insulating) and layers 6 of the semiconducting material is defined entirely by application constraints.

Note also that the structure of a detector according to the invention can induce spectacular improvements to the efficiency (of the order of 50%) with an appropriate thickness of material along the direction of the radiation to be detected, and the spatial resolution that may be of the order of 100 µm by choosing a pitch that is appropriate for tracks 22.

The spatial resolution in the direction perpendicular to the sheets 4 is determined by the pitch between the sheets 4 and between the tracks (that may be of the order of 50 µm to 200 µm).

X-rays are detected preferably using heavy metal, for example tungsten or lead.

For guidance, and in no way restrictively, for a case in which X photons with an energy equal to 5 MeV are to be detected, a 2 cm thick detector could be used (measured from face 8 as far as face 10 in FIG. 1), 100 µm thick layers 6 made of CdTe or diamond and 400 µm thick sheets 4 made of tungsten with tracks 22 at a pitch of 0.5 mm. These dimensions could be reduced if necessary, since a pitch of 100 mm would be technologically feasible.

We will now describe an example process for manufacturing the detector shown in FIGS. 1 and 2.

The sheets 4 of conducting material may be made using any process.

Their surface must be sufficiently conducting and must not be oxidized.

This surface may be coated, if necessary, by a metallic deposit more suitable for making a resistive contact with the semiconducting material, for example a layer of gold.

The following procedure may be used to form the tracks 22 that may be made of gold or a metal better adapted to the semiconductor used, on the layers 6 of semiconducting material:

a first thickness (for example 50 µm) of semiconducting material is deposited on one of the faces on one of the conducting sheets 4, for example by chemical vapor deposition, by epitaxy, by pouring in strips, by liquid phase deposition or by a sol-gel deposition), the gold tracks 22, for example 5 µm wide, are deposited by evaporation through a mask or by a photolithography process, onto the semiconducting material thus deposited, and a second thickness of semiconducting material is deposited on the first thickness in order to cover the tracks 22 and to obtain the required total thickness of semiconducting material (for example 100 µm).

The same process is used for each conducting sheet 4.

As a variant, it would also be possible to deposit a half-layer of semiconducting material on each opposite side of two successive sheets, and then form the group of tracks on one of the half-layers.

The conducting sheets 4 thus covered are then stacked to obtain an alternation of conducting sheets 4 and semiconducting material layers 6 and are held in contact with each other by applying slight pressure exerted by appropriate means, for example a mechanical device or an electrically conducting glue.

Figure 3:
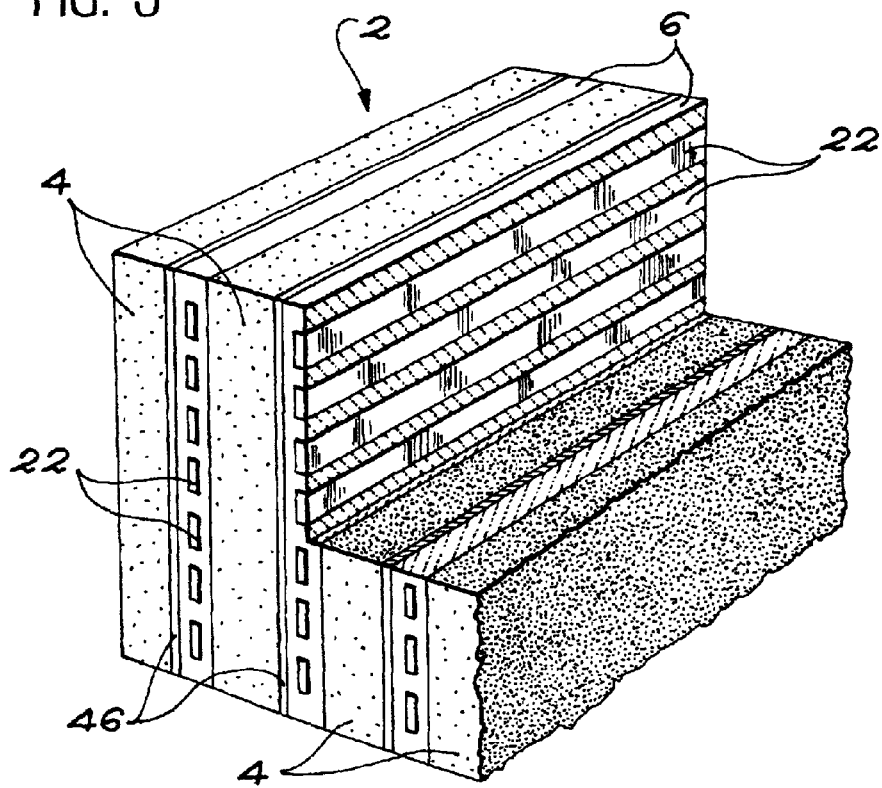
FIG. 3 is a diagrammatic sectional perspective view of another detector according to the invention.

The detector according to the invention that is diagrammatically shown in a sectional perspective view on FIG. 3, is different from than in FIG. 1 due to the fact that the sheets 4 are electrically insulating, for example made of plastic in the case shown in FIG. 3, for example in order to detect neutrons, and by the fact that a thin electrically conducting layer 46 (thickness of the order of 5 µm to 10 µm) for example made of gold or copper as shown on FIG. 3, is inserted between each sheet 4 of insulating material and the corresponding layer of semiconducting material.

In this case, the required electrical potential with respect to the tracks 22 can be applied to all electrically conducting layers 46 through electrically conducting tracks such as the tracks 42 formed on the insulating plate 40 (FIG. 1).

Figure 4:
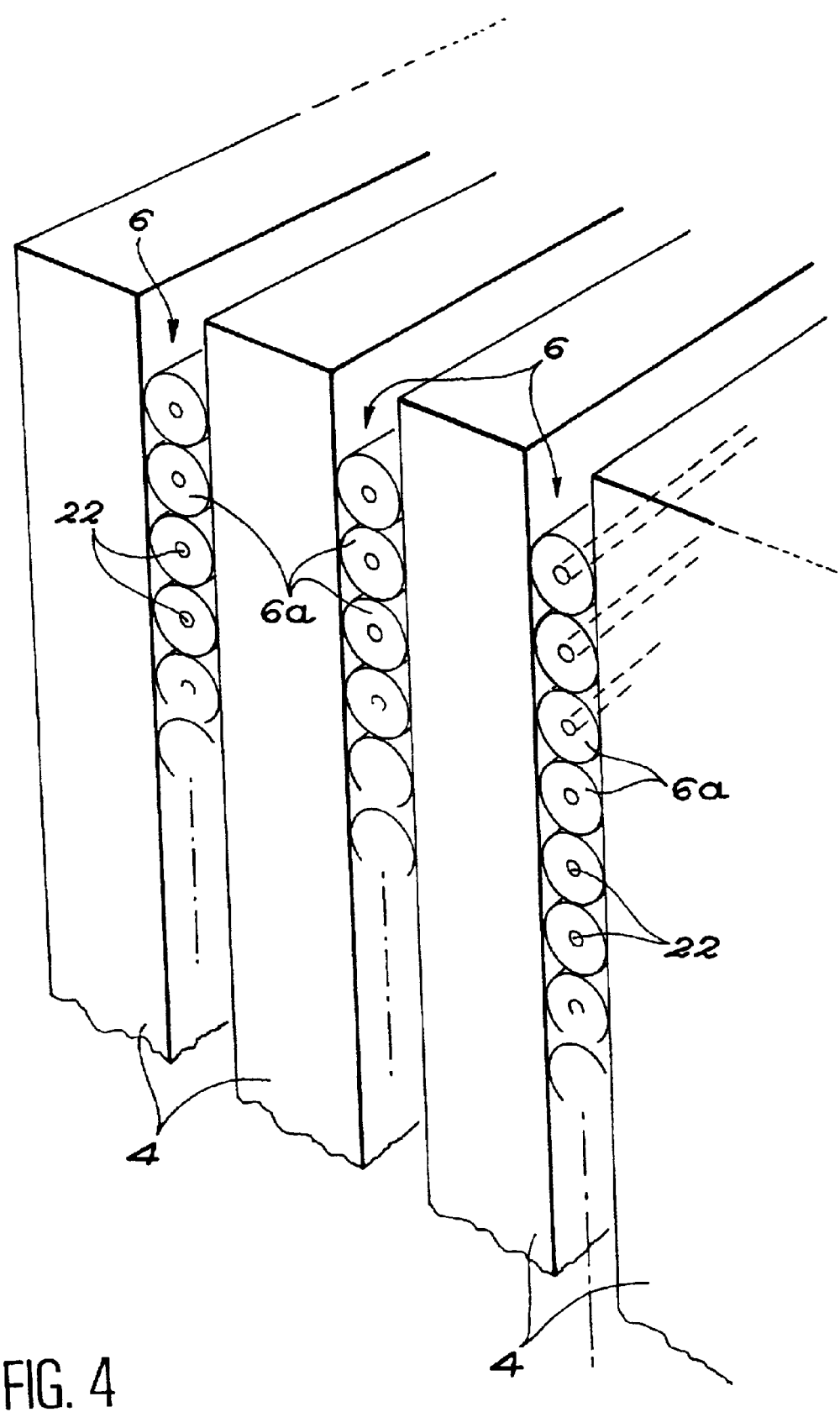
FIG. 4 is a diagrammatic and partial perspective view of another detector according to the invention.

FIG. 4 is a diagrammatic and partial perspective view of a variant embodiment of the detector in FIG. 1.

In the detector in FIG. 4, each layer 6 is a layer of adjacent wires 6a made of semiconducting material, each wire containing a metallic strand forming a track 22 along its centerline.

The wires 6a provided with these tracks 22 can be made by extrusion or drawing.

The following documents are referenced in this description:

[1] V. Perez-Mendez, S. I. Parker, IEEE Trans. Nucl. Sci. NS-21 (1974) 45

[2] S. N. Kaplan, L. Kaufman, V. Perez-Mendez, K. Valentine, Nuclear Instruments and Methods 106 (1973) 397

[3] A. P. Jeavons, G. Charpak, R. J. Stubbs, NIM 124 (1975) 49–503

[4] Jean-Louis Gerstenmayer, Damien Lebrun and Claude Hennion, "Multistep parallel plate avalanche chamber as a 2D imager for MeV pulsed radiography", Proc. SPIE, vol. 2859, p. 107 to 114, Aug. 7 to 9 conference, 1996, Denver, Colo., USA

[5] J. L. Gerstenmayer, "High DQE performance X-and Gamma-ray fast imagers: emergent concepts", 1998 Symposium on Radiation Detection and Measurement, Ann Arbor, Mich., May 11 to 14, 1998 Proceedings in Nuclear and Methods in Physics Research A.

What is claimed is:

1. Two-dimensional detector of incident ionizing radiation composed of first particles, comprising:

a stack of sheets of a first material configured to emit second particles by interaction with the incident ionizing radiation;

layers of a semiconducting material that alternate with the sheets of the first material and that are able to be ionized by the second particles, each of the layers being associated with one of the sheets, the stack having opposite first and second faces each including corresponding edges of the sheets and layers, the detector configured to be laid out such that the ionizing radiation arrives on the first face, a length of each sheet measured from the first face as far as the second face being equal to at least one tenth of a free average path of the first particles in the first material;

groups of parallel and electrically conducting tracks extending from the first face to the second face parallel to the layers, each group being associated with one of the layers and in contact with said one of the layers, the tracks being designed to collect charge carriers that are generated in the layers by interaction of the layers with at least one of the second particles and the first particles and that are representative of the first particles in intensity and in position; and means for creating an electric field capable of causing collection of charge carriers through the tracks, wherein said first material is a different material than a material used to form the layers of semiconducting material.

2. Detector according to claim 1, wherein the first material is electrically conducting, the tracks are electrically insulated from the sheets, and the means for creating the electric field comprises means for applying a voltage between the tracks and the sheets, this voltage able to cause the collection of charge carriers through the tracks.

3. Detector according to claim 1, wherein each group of tracks is contained within the layer with which it is associated.

4. Detector according to claim 3, wherein the first material is electrically conducting and the means for creating the electric field comprises means for applying a voltage between the tracks and the sheets, this voltage able to cause the collection of charge carriers through the tracks.

5. Detector according to claim 1, wherein the sheets are electrically insulating, an electrically conducting layer is inserted between each layer of semiconducting material and the sheet that is associated with it, and the means for creating the electric field comprises means for applying a voltage between the tracks and the electrically conducting layers, this voltage able to cause the collection of charge carriers through the tracks.

6. Detector according to claim 1, wherein the semiconducting material is selected from the group consisting of thin layers of diamond, CdTe, ZnTe, CdZnTe, AsGa and its alloys, InP, InSb, SiC, crystalline silicon, amorphous silicon, organic crystals, amorphous selenium, and chalcogenic glass $As_2S_3$).

7. Detector according to claim 1, further comprising an electronic device configured to read electrical signals output by tracks when the tracks collect charge carriers.

8. Detector according to claim 7, wherein one end of each track is curved to extend onto an edge of the corresponding layer of semiconducting material, this edge being located on the second face of the stack, and said device comprises electrically conducting pads that are respectively in contact with the curved ends of the tracks.

9. Process for manufacturing the detector according to claim 1, wherein a layer of semiconducting material is formed on each sheet, this layer being provided with the group of tracks associated with it, and the sheets provided with layers of semiconducting material and tracks are assembled together to obtain the stack in which these layers of semiconducting material alternate with the sheets.

10. Process according to claim 9, wherein a first layer of semiconducting material is formed on each sheet, a thickness of said first layer of semiconducting material being less than a thickness of said layer of semiconducting material, the group of tracks is formed on this first layer and a second layer of semiconducting material that covers these tracks is formed on the first layer, a total thickness of the first and second layers being equal to the thickness of said layer of semiconducting material.

11. Process for manufacturing the detector according to claim 1, wherein a half layer of semiconducting material is deposited on two opposite faces of two successive sheets, and then the group of tracks is formed on one of the half layers and the sheets thus covered are assembled together to create the stack in which the layers alternate with the sheets.

* * * * *